United States Patent [19]
Terahara

[11] 3,716,952
[45] Feb. 20, 1973

[54] LOADING DEVICE

[75] Inventor: Goro Terahara, Kariya, Japan

[73] Assignee: Toyoda Koki Kabushiki Kaisha, Kairya-shi, Japan

[22] Filed: Aug. 13, 1971

[21] Appl. No.: 171,620

[52] U.S. Cl............51/215 HM, 51/215 H, 214/1 B
[51] Int. Cl........................B24b 47/20, B24b 17/00
[58] Field of Search.....51/215 R, 215 AR, 215 HM, 51/215 CP, 215 H, 216 ND, 101 R; 214/1 B, 1 BB, 1 BC, 1 BD

[56] References Cited

UNITED STATES PATENTS

| | | |
|---|---|---|
| 2,978,117 | 4/1961 | Thompson.....................51/215 H X |
| 3,425,169 | 2/1969 | Dunn............................51/215 HM X |
| 2,838,884 | 6/1958 | Balsiger.............................51/101 R |
| 3,247,619 | 4/1966 | Price..................................51/101 R |
| 3,110,132 | 11/1963 | Bassoff...........................51/215 H X |

Primary Examiner—Donald G. Kelly
Attorney—Norman F. Oblon et al.

[57] ABSTRACT

A device for automatically loading a non-circular workpiece onto a machine tool in a preselected angular position. The device comprises an indexing mechanism for indexing the workpiece into the proper angular position, a holding mechanism for holding the indexed workpiece, and a shifting mechanism for moving the workpiece from the holding mechanism to a clamping fixture of the machine tool without any deviation from the established proper angular position.

18 Claims, 10 Drawing Figures

PATENTED FEB 20 1973 3,716,952

INVENTOR
GORO TERAHARA

BY Oblon, Fisher & Spivak
ATTORNEYS

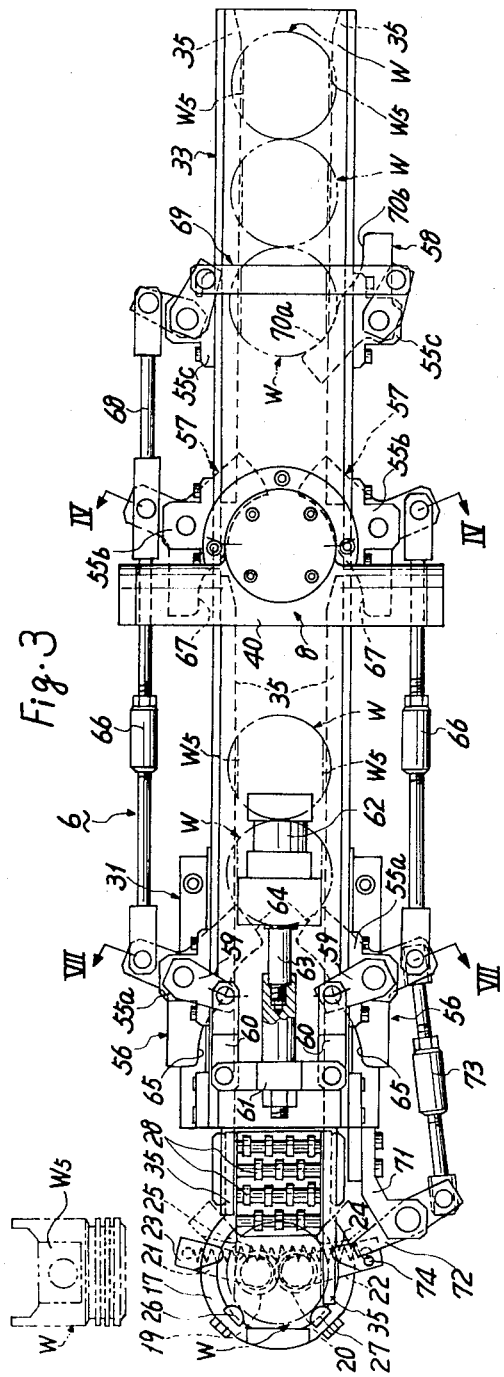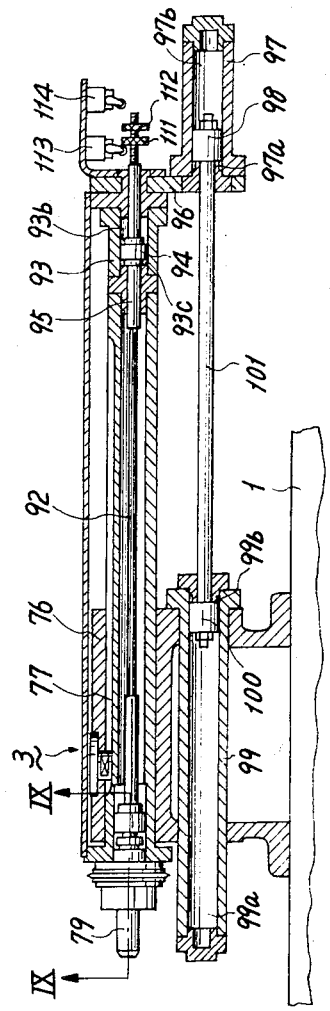

LOADING DEVICE

BACKGROUND OF THE INVENTION

The present invention is related generally to a device for loading workpieces, and more particularly to an improved device for loading a non-circular workpiece in a proper angular relationship with respect to a given machine tool.

When a non-circular workpiece is turned or ground on a machine tool, it generally must be loaded having a predetermined angular relationship with a clamping fixture of the machine tool. For a better understanding, assume that the non-circular workpiece is a piston for an internal combustion engine, which is one of the most sophisticated parts in an industrial field and is oval in shape at the skirt portion thereof, and thus, should be ground by a particular piston grinding machine which grinds the skirt portion duplicating a master cam. Thus, an essential requirement is to establish a predetermined angular relationship between the master cam and the workpiece. A device for automatically loading such a non-circular workpiece, as the aforedescribed piston, with the required angular relationship relative to the clamping fixture or the master cam of the machine tool has been long needed, and until now such a device has not been successfully developed.

SUMMARY OF THE INVENTION

It is, therefore, an object of the present invention to provide a device for automatically loading a non-circular workpiece onto a machine tool in a predetermined angular position relative thereto.

Another object of the present invention is to provide a device operable for detecting the angular position of a workpiece being received by a machine tool and to arrange the workpiece so that it may be loaded on the machine tool in a preselected angular relationship therewith.

Still another object of the present invention is to provide a device capable of shifting a workpiece toward a clamping fixture of a machine tool without changing the position thereof from an established angular position.

A still further object of this invention is to provide a device capable of moving workpieces one by one into an indexing mechanism and a holding mechanism of a machine tool.

The foregoing and other objects are attained according to the present invention by checking every non-circular workpiece, such as the aforementioned piston, on a supply chute to determine whether it is located in the proper angular position, and turning the same into the particular angular position with an indexing mechanism. When the proper angular relationship is obtained, the workpiece is then shifted into a holding mechanism still in the established angular position, and from the holding mechanism, the workpiece is moved to a clamping fixture of a machine tool by shifting mechanism which also does not alter the established angular position.

BRIEF DESCRIPTION OF THE DRAWINGS

Various other objects, features and attendant advantages of the present invention will be more fully appreciated as the same becomes better understood from the following detailed description when considered in connection with the accompanying Drawings, wherein like reference numerals designate like or corresponding parts throughout the several views and in which:

FIG. 3 is a top view showing a workpiece charging mechanism in detail;

FIG. 8 is a sectional view showing a workpiece shifting mechanism, taken along the line VIII—VIII in FIG. 1;

DETAILED DESCRIPTION OF THE INVENTION

Figure 1:
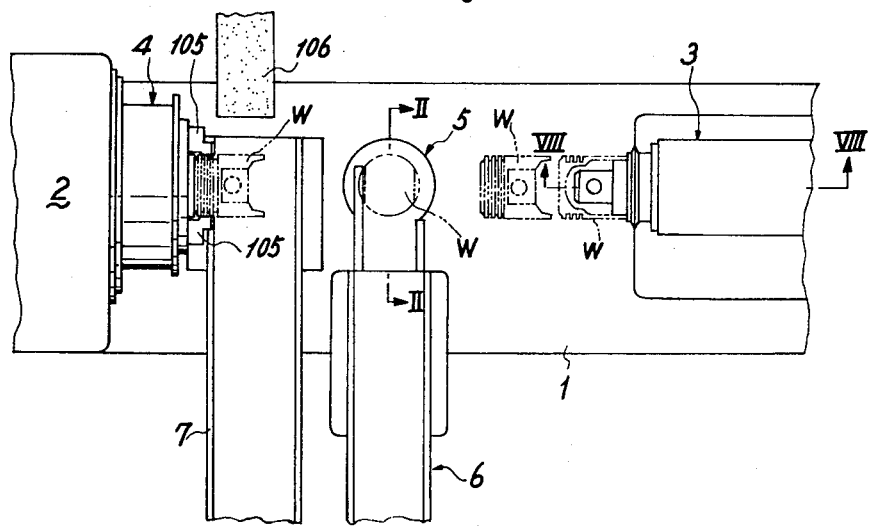
FIG. 1 is a schematic view showing the arrangement of a preferred embodiment of a loading device according to the present invention.

Referring now to the Drawings, and more particularly to FIG. 1, a preferred embodiment characterizing the loading of a piston for an internal combustion engine onto a piston grinding machine is briefly described. A head stock 2 and a shifting mechanism 3 are mounted on a traverse table 1 of a piston grinding machine in predetermined spaced relation. The head stock 2 is provided with a rotatable spindle, not shown, which carries a clamping fixture 4 of a diaphragm type for supporting a piston workpiece W. A workpiece turning mechanism 5 is fixed on the traverse table 1 between the head stock 2 and the shifting mechanism 3. A workpiece charging mechanism 6 extends from the turning mechanism 5 in a perpendicular with respect to the axis of the spindle of the head stock 2 and a chute 7 parallel therewith for discharging a ground workpiece from the machine is secured on the traverse table 1 under the clamping fixture 4.

Figure 2:
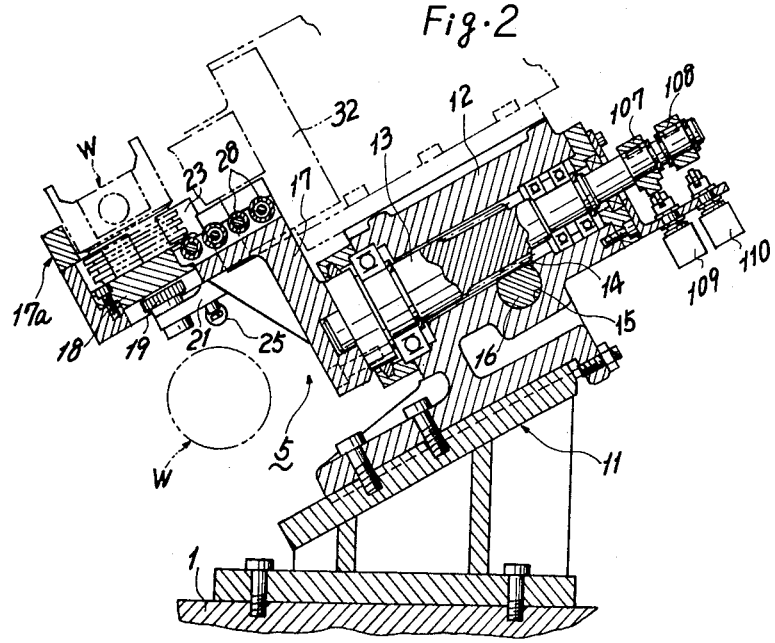
FIG. 2 is a detailed sectional view showing a workpiece turning mechanism, taken along the line II—II in FIG. 1.

Reference now is made to FIG. 2 for a detailed description of the workpiece turning mechanism 5. Mounted on the table 1 is a pedestal 11 having a supporting block 12 in turn fixed thereon. A shaft 13 is rotatably journalled in the supporting block 12 with its axis being oblique to the table 1 and being arranged so as to intersect the axis of the head stock spindle. A pinion 14 is formed on the shaft 13 intermediate the ends thereof being meshingly engaged with a rack 16 formed on the piston rod of a hydraulic actuator 15 provided in the block 12. The rack 16 of the hydraulic actuator 15 may be moved back and forth by the pressure fluid being supplied thereto so that the shaft 13 is rotated through a ninety degree turn in one direction or the other. The ends of the rotational motions of the shaft 13 may be detected by limit switches 109 and 110 which are respectively actuated by dogs 107 and 108 secured to one end of the shaft 13.

One arm of an L-shaped bracket 17 is connected to the other end of the shaft 13 and the other arm thereof is provided with a holding mechanism 17a for holding a piston workpiece W being shifted from the workpiece charging mechanism 6. A plate member 18 for supporting the workpiece W is fixed to the other arm of the L-shaped bracket 17. A pair of gears 19 and 20, shown in FIG. 3, being interengaged with each other, is rotatably carried on the underside of the plate member 18. Link arms 21 and 22 are respectively fixedly connected to the gears 19 and 20 at one of the ends thereof and at their other ends are provided with abutments 23 and 24, respectively, for pushing the workpiece W. A tension spring 25 is interposed between the free tips of the link arms 21 and 22 so that the abutments 23 and 24 are always urged toward each other or toward the piston workpiece W. Thus, when the piston workpiece W is moved down onto the workpiece holding mechanism 17a, the piston workpiece W is urged on stops 26 and 27 on the bracket 17 by means of the abutments 23 and 24 so that the workpiece W is held in position.

In this situation, the axis of the piston workpiece W is perpendicular to the axis of the head stock spindle, and when the bracket 17 is turned by means of the hydraulic actuator 15 through 90 degrees, the axis of the piston workpiece W coincides with the axis of the head stock spindle or the clamping fixture 4.

A plurality of guide rollers 28 for charging the workpiece W into the holding mechanism 17a are rotatably mounted on the top portion of the bracket 17, being shown in FIGS. 2 and 3.

Figure 7:
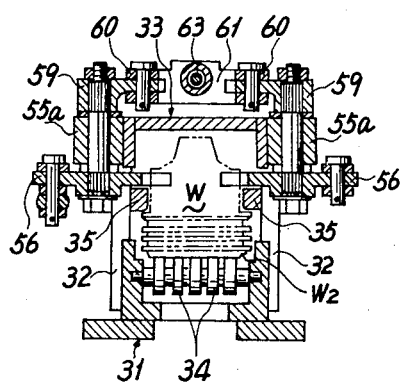
FIG. 7 is a sectional view taken along the line VII—VII in FIG. 3.

Fixedly mounted on the supporting block 12 is a lower chute 31 which extends in oblique relationship with the traverse table 1 but is parallel with the axis of the shaft 13. At the middle of the lower chute 31 there is provided an indexing mechanism 8 for indexing the piston workpiece W on the lower chute 31 into a particular angular position. An upper chute 33 is mounted on a pair of panels 32 which are secured to the lower chute 31 at both sides thereof. Guide rollers 34, as shown in FIG. 7, are rotatably mounted in the lower chute 31 at predetermined intervals for transferring the workpiece W.

Figure 4:
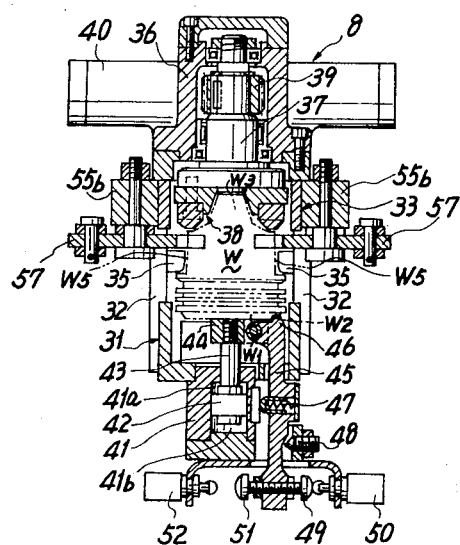
FIG. 4 is a sectional view showing a workpiece indexing mechanism, taken along the line IV—IV in FIG. 3.

Fixedly mounted on the upper chute 33 is a housing 36 having a rotatable shaft 37 provided therein, as shown in FIG. 4. The shaft 37 protrudes into the inside of the upper chute 33 and, at the lower end thereof, is provided with an engaging piece 38 which may straddle a protruding portion W3 of the skirt portion of the piston workpiece W so that the piston workpiece may be turned through the engaging piece 38. A pinion 39 is provided on the shaft 37 intermediate its ends being meshingly engaged with the rack on a rack piston, not shown, which is slidably contained in a hydraulic actuator 40 and is operative to turn the shaft 37 through 180° so that the piston workpiece W, which is in an opposite angular position, is turned into the required angular position through the engaging piece 38. It is to be appreciated that, in this particular embodiment, guide rails 35, 35, which are secured to the panels 32, 32, and keep the piston workpiece W with its axis vertically oriented and from being turned from a fixed angular position, are discontinued at the indexing mechanism 8 so that the piston workpiece W may be turned. A hydraulic actuator 41 for lifting the piston workpiece W is fixed to the under side of the lower chute 31 in a position aligned with the shaft 37, and has a piston 42 with a piston rod 43 thereon disposed in a vertical direction therein. The piston rod 43 is provided with a supporting block 44 at the top end thereof. A locating link 45, which is formed with an engaging portion 46 for engaging a front mark W2 provided at a particular portion of the piston workpiece W to denote the angular position thereof, is pivotably mounted on the end of the supporting block 44 being urged in a counter clockwise direction, as seen in FIG. 4, by a compression spring 47 interposed between the link 45 and the housing of the hydraulic actuator 41 so that the engaging portion 46 is always urged toward the piston workpiece W. The counterclockwise rotation of the link 45 is regulated by a stop 48 threadedly engaged with the housing of the hydraulic actuator 41. A pair of dogs 49 and 51 facing in opposite directions is adjustably mounted at the lower end of the link 45 and limit switches 50 and 52 for detecting the fact that the piston workpiece W is located in the proper angular position are positioned to be respectively actuated by the dogs 49 and 51. The limit switches 50 and 52 are respectively actuated when the engaging portion 46 of the link 45 is and is not engaged with the front mark W2 of the piston workpiece W. Since the piston workpiece W is slidable down into the indexing mechanism portion when in the proper angular position or in an angular position directly opposite thereto through the agency of the guide rails 35, 35 arranged to engage diametrically opposed parallel notches W5, W5 on the piston workpiece W, the hydraulic actuator 40 is operable to turn the workpiece W through 180° to get a proper angular position only when the limit switch 52 is actuated, in other words, when the piston workpiece W is moved down in an improper angular position.

After all the workpieces are consequently brought into the required angular position, they are moved down into the holding mechanism 17a on the bracket 17. While the workpiece W is sliding into the holding mechanism 17a on the lower chute 31, the workpiece W cannot be turned since the guide rails 35,35 on both sides thereof prevent the workpiece W from deviating from the established angular position.

Figure 5:
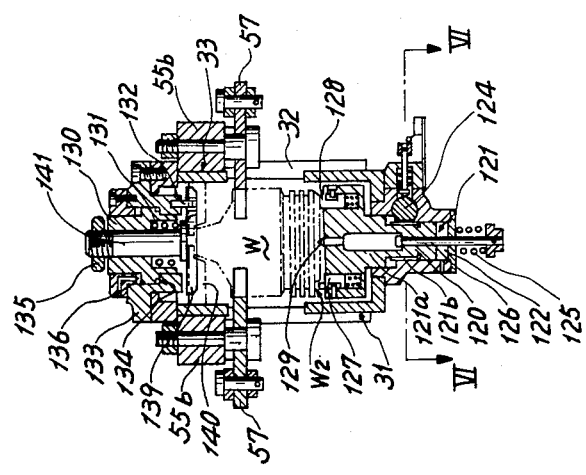
FIG. 5 is a sectional view showing another embodiment of a workpiece indexing mechanism.
Figure 6:
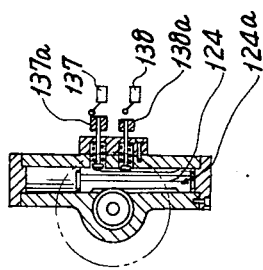
FIG. 6 is a sectional view taken along the line VI—VI in FIG. 5.

Referring now to FIGS. 5 and 6, a second embodiment of an indexing mechanism 8 is illustrated which is applicable to a piston workpiece W not being provided with the side notches W5, W5, described above, in which case the piston workpiece W is slidable down into the indexing mechanism 8 in any angular direction, as described hereinbelow.

A hydraulic actuator 121 for lifting the piston workpiece W is secured to the under side of the lower chute 31. A piston rod 121a of the hydraulic actuator 121 is provided with an enlargement at the top portion thereof. In the enlargement, an engaging pin 127 and a pin 128 are slidably mounted in axial directions thereof being retained against rotation, respectively, by keyed engagement with the piston rod enlargement. The engaging pin 127 is constantly urged upward by a compression spring and is arranged to be engaged with a front mark W2 in the piston workpiece W when the piston workpiece W is brought into the proper angular position and the pin 128 is urged upward by another compression spring and is provided with a bearing type upper surface so that the piston workpiece W may be smoothly turned on the pins 127 and 128. A center 129 is provided in the center of the enlargement of the piston rod 121a to support the piston workpiece W at a predetermined position. Another hydraulic actuator 124 for turning the piston rod 121a to bring the piston workpiece W into a proper angular position through the engagement of the engaging pin 127 and the front mark W2 is provided in the housing of the hydraulic actuator 121 and has a slidable rack piston 124a therein. A pinion 121b is formed on the piston rod 121a and is engaged with the rack on the rack piston 124a. The stroke ends of the rack piston 124a are detected by two limit switches 137 and 138 which are respectively actuated by dogs 137a and 138a. A rod 126 is connected through the piston 120 of the hydraulic actuator 121 projecting to the outside thereof and is biased downwardly by a compressed spring 125 interposed between the housing of the actuator 121 and the rod 126 for normally holding the piston 120 in a lower position. When pressurized fluid is introduced into the lower chamber 122 of the hydraulic actuator 121, the piston rod 121a is moved upward against the force of the compression spring 125 so that the piston workpiece W is lifted.

On the upper chute 33, there is provided an actuator 133 having therein a slidable piston 130 in which a rod 141 is slidably mounted being provided on its lower face with a pushing plate 139 for pushing the piston workpiece W downwardly. A nut 135 threadedly engaged with the rod 141 at the top end thereof limits the range of up and down motion of the rod 141 with respect to the piston 130. A pin 132 mounted on the housing of the actuator 133 engages the pushing plate 139 for preventing the pushing plate 139 from rotation. A pair of guide rails 140, 140 are secured to the panels 32, 32 between the indexing mechanism 8 and the holding mechanism 17a so that the piston workpiece W may not be deviated from the proper angular position which has been established by the indexing mechanism.

In the vicinity of both ends and the middle of the chute 31 there are provided three sets of brackets, 55a, 55b and 55c, as shown in FIG. 3, which respectively support front shutters 56 and 56, middle shutters 57 and 57 and rear shutter 58. The shutters control the flow of the workpieces W so that the workpiece W is supplied to the workpiece indexing mechanism 8 and holding mechanism 17a one by one. The front shutters are fixedly connected by means of pins to link members 59 and 59 which are, in turn, connected to a connecting rod 61 by links 60 and 60. The rod 61 is connected to a piston rod 63 of a piston, not shown, which is slidably mounted in a hydraulic actuator 62 mounted on the upper chute 33. When the piston rod 63 is moved in one direction and the shutters 56, 56 are opened from the position shown in FIG. 3, the workpiece W blocked by the upper tips 64, 64 of the shutters 56, 56 is moved down and is, in turn, engaged with the lower tips 65, 65 thereof. When the piston rod 63 is moved in the other direction, the shutters 56, 56 are moved into the position shown in FIG. 3 so that the workpiece W now blocked by the lower tips 65, 65 thereof is moved into the holding mechanism 17a, and the following workpiece W is blocked by the upper tips 64, 64 of the shutters 56, 56, whereby the piston workpieces W are supplied to the holding mechanism 17a one by one.

The shutters 57, 57 of the middle portion are connected to the shutters 56, 56 by connecting rods 66, 66 so that the shutters 57, 57 are opened and closed simultaneously with the shutters 56, 56. As in the first embodiment of the indexing mechanism 8, the piston workpiece W is checked for location in a proper angular position, and if not, then turned into the proper angular position, the piston workpiece W being supported by the lower tips 67, 67 of the shutters 57, 57. The rear shutter 58, which is operative to supply the piston workpieces W one by one into the indexing mechanism 8, is connected to one of the middle shutters 57, 57, by means of a connecting rod 68 and its associated linking mechanism 69.

Fixedly mounted at the front end of the lower chute 31 is a bracket 71 on which a control link 72 is pivotally mounted. The one end of the control link 72 is connected to the front shutter 56 through a connecting rod 73 so that the control link 72 is moved in synchronism with the shutters. The other or front end of the control link 72 is arranged to engage a pin 74 press-fitted on one of the abutments 23 and 24, whereby the abutments 23 and 24 are turned to open against the force of the tension spring 25 in conjunction with the motion of the shutters resulting in the piston workpiece W being passed through the front shutters 56, 56 and slidably moved down into the holding mechanism 17a.

Figure 10:
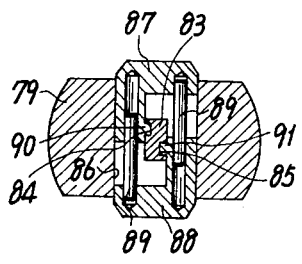
FIG. 10 is a sectional view taken along the line X—X in FIG. 9.
Figure 9:
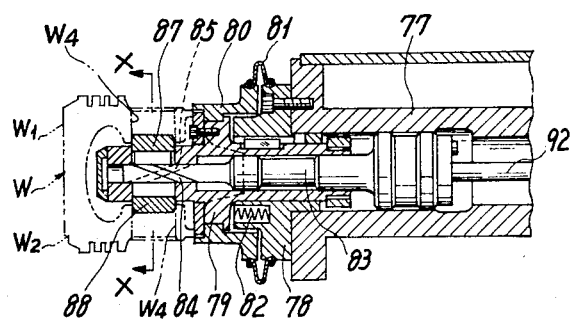
FIG. 9 is a sectional view taken along the line IX—IX in FIG. 8.

The shifting mechanism may be described referring particularly to FIGS. 8, 9 and 10. A housing 76 of the shifting mechanism is mounted on the table 1 and carries a ram 77 being slidable in an axial direction but restrained from rotational motion. A supporting member 79 is slidably carried on a bushing 78 secured to the front end of the ram 77 and is normally urged toward the left, as shown in FIGS. 9 and 10, by a compression spring 82 interposed therebetween. A ring member 80 is secured to the supporting member 79 and is connected to the bushing 78 by an elastic member 81 which regulates the range of motion of the supporting member 79. Slidably mounted in the supporting member 79 is a control rod 83 having a pair of grooves 84 and 85 in the vicinity of the front end thereof which are oblique with respect to the axis thereof and oppositely directed relative to each other. Locating pins 87 and 88 are slidably inserted in a bore 86 perforated in the vicinity of the front end of the supporting member 79 and are guided with each other through guide pins 89 and 89. In the interior of the locating pins 87 and 88, there are provided engaging portions 90 and 91 which are respectively engaged with the oblique grooves 84 and 85 of the control rod 83. The control rod 83 is connected by a connecting rod 92 to a piston rod 95 of a piston 94 which is slidably positioned in a hydraulic actuator 93 provided at the rear portion of the ram 77. The piston 94 is moved by pressurized fluid supplied to the hydraulic actuator 93 to move the control rod 83 back and forth so that the locating pins 87 and 88 may be moved in a radial direction for causing them to engage with and be disengaged from pin holes W4, W4 of the piston workpiece W. The axial motion of the piston 94 is controlled by limit switches 113 and 114 which are respectively actuated by dogs 111 and 112 on a piston rod 93b secured to one end of the piston 94.

A first shifting actuator 97 having a piston 98 slidably disposed therein is fixed to a mounting plate 96 secured to the ram 77 at the rear end thereof. A second shifting actuator 99 having a slidable piston 100 which is connected to the piston 98 by a rod 101 is provided in the housing 76. The movable range of the piston 100 is arranged to be longer than that of the piston 98. Accordingly, the ram 77 may be positioned at three different positions, that is, an original position shown in FIG. 8, a middle position advanced by the actuator 97 and a front position being advanced further by both actuators 97 and 99. When the ram 77 is located at the middle position, the piston workpiece W may be transferred from the holding mechanism 17a to the ram 77, and when the ram 77 is located at the front position, the piston workpiece W is transferred from the ram 77 to the clamping fixture 4 which holds the workpiece W by clamping pawls 105, 105, and thereafter, the skirt portion of the piston workpiece W is ground by the grinding wheel 106 duplicating the master cam, not shown.

The operation of the above-mentioned device will now be described. At the start of the grinding operation, one piston workpiece W to be ground is clamped to the clamping fixture 4 by the pawls 105, 105, while another workpiece W which is supposed to shift to the clamping fixture 4 is supported by the shifting mechanism 3 in the required angular position by means of the locating pins 87 and 88. Another piston workpiece W is held by the holding mechanism 17a, and on the chute 31 still another workpiece W already indexed into the proper angular position is held by the lower tips 65 and 65 of the shutters 56 and 56 and yet another workpiece about to be indexed by the indexing mechanism 8 is embraced by the lower tips 67 and 67 of the shutters 57 and 57.

When the grinding operation on the piston workpiece W on the clamping fixture 4 has been completed and accordingly, the wheel slide, not shown, having a grinding wheel 106 is retracted and the rotation of the clamping fixture is brought to a halt at a well calculated angular position, the piston workpiece W is unclamped from the clamping fixture 4 so that the machined workpiece W is discharged through the discharging chute 7. Upon retraction of the wheel slide into the retracted or original position thereof, a signal for confirming the retraction of the wheel slide is generated so that fluid under pressure is supplied to a front chamber 97a of the first actuator 97 and a rear chamber 99b of the second actuator 99, whereby the correctly indexed workpiece W is shifted to the clamping fixture 4. When the workpiece W has been carried to the clamping fixture 4, a confirmation signal is generated resulting in the head portion of the piston workpiece W being clamped by the pawls 105 and 105. In this situation, the skirt of the workpiece W and the master cam of the piston grinding machine are angularly coincided.

Following the clamping of the piston workpiece W by the pawls 105 and 105, pressurized fluid is supplied to the rear chamber 93b of the actuator 93 to advance the control rod 83 through the piston 94. Accordingly, the locating pins 87 and 88 respectively engaged with the oblique grooves 84 and 85 are retracted radially into the control rod 83 to be thereby disengaged from the pin holes W4, W4 of the piston workpiece W. When the piston 94 is advanced to the calculated advanced position, the limit switch 113 is actuated by the dog 111 causing a signal to be generated for supplying the pressurized fluid to the rear chamber 97b of the actuator 97 and the front chamber 99a of the actuator 99 so that the shifting ram 77 is retracted to the original position thereof. Upon completion of the retraction of the shifting ram 77, a confirmation signal is produced, whereby the clamping fixture 4 is rotated and the wheel slide is advanced toward the piston workpiece W to perform a grinding operation thereon. Simultaneously, pressurized fluid is applied to the actuator 15 so that the holding mechanism 17a may be rotated by 90° through rack piston 16, pinion 14 and shaft 13, whereby the axis of the piston workpiece W on the holding mechanism 17a is coincided with the axis of the head spindle and the shifting ram 77. When the rotation of the holding mechanism 17a is completed, the limit switch 110 is actuated by the dog 108 to thereby generate a signal which initiates the supply of pressurized fluid to the front chamber 97a of the actuator 97 to carry the shifting ram 77 to the middle position thereof. Subsequently, the supporting member 79 secured to the shifting ram 77 is inserted into the piston workpiece W and thus, through the signal produced when the piston 98 of the actuator 97 is moved to the front stroke end thereof, the pressurized fluid is supplied to the front chamber 93c of the hydraulic actuator 93 resulting in the control rod 83 being retracted to thereby extrude the locating pins 87 and 88 to engage the same with the piston holes W4, W4 of the piston workpiece W being held by the holding mechanism 17a. Therefore, the piston workpiece W is transferred to the shifting ram 77 from the holding mechanism 17a without any deviation from the proper indexed angular position. When the locating pins 87 and 88 are fully advanced, in other words, when the piston 94 is fully retracted, the limit switch 114 is actuated by the dog 112 to thereby supply an electric signal which initiates the application of pressurized fluid to the rear chamber 97b of the first actuator 97 whereby the shifting ram 77 is retracted to the original position thereof. As understood from the above description, the piston workpiece W is pulled out against the force of the tension spring 25 from the holding mechanism and transferred to the shifting ram 77. In the original position, the piston workpiece W on the ram 77 is kept until the grinding operation on the piston workpiece W previously shifted to the clamping fixture 4 is completed. By a signal produced when the shifting ram 77 is retracted to the original position thereof, pressurized fluid is supplied to the actuator 15 which effectuates to turn the holding mechanism 17a through 90° in an opposite direction into the former or original position thereof.

When the holding mechanism 17a is turned through 90°, and thus the limit switch 109 is actuated by the dog 107, the hydraulic actuator 62 is operated by pressurized fluid supplied thereto so that the pair of shutters 56, 56 is opened through the rod 61 and its associated link mechanism, whereby the piston workpiece W supported by the lower tips 65, 65 of the shutters 56,56 is disengaged therefrom and moved therebeyond into the holding mechanism 17a and the following workpiece W is blocked by the upper tips 64, 64 thereof. In conjunction with the operation of the front shutters 56, 56 the control link 72 is turned through the connecting rod 73 to thereby move the link arm 22 against the force of the tension spring 25 and thus, to move the complementary link arm 23 through the pinions 19 and 20. Accordingly, the piston workpiece W passing through the shutters 56, 56 may be moved into the holding mechanism 17a without engagement with the abutments 23 and 24. As understood from the above description, when the front shutters 56, 56 are operated, the middle shutters 57, 57 and the rear shutter 58 are also operated through the connecting rods 66, 66 and 68, whereby the workpiece W indexed into the appropriate angular position slides toward the front shutters 56, 56, and another workpiece W blocked by the upper tip 70b of the shutter 58 is, in turn, blocked by the lower tip 70a thereof.

Next, pressurized fluid is again applied to the hydraulic actuator 62 to thereby close the shutters 56, 56, 57, 57 and 58. Accordingly, one fresh workpiece W is supported by the lower tips 65, 65 of the shutters 56, 56, another fresh workpiece W sliding down from the rear shutter 58 is supported by the lower tips 67, 67 of the middle shutters 57, 57 and the rear shutter 58 blocks the following workpiece W by the upper tip 70b thereof. Simultaneously, the piston workpiece W being moved down into the holding mechanism 17a is urged toward the stops 26, 27 by the compression spring 25 through the abutment 23, 24 since the control link 72 is turned to disengage the same from the pin 74 mounted on the abutment 24.

Upon the completion of closing all the shutters, a fresh workpiece W is supported by the lower tips 67, 67 and the piston 43 of the actuator 41 is, in the case where the first embodiment of an indexing mechanism 8 as shown in FIG. 4 is applied, moved up by pressurized fluid supplied to the lower chamber 41b thereof. By upward movement of the piston 42, the piston workpiece W is lifted by the supporting block 44, whereby the link 45 is urged to the head portion W1 of the workpiece W around the periphery thereof by the compression spring 47.

In case the piston workpiece W is not located in the proper angular position, the link 45 is pivoted against the force of the compression spring 47 to actuate the limit switch 52, since the engaging portion 46 thereof is not engaged with the notch or front mark W2 of the piston workpiece W. It is to be recalled that every piston workpiece W being slided downward into the indexing mechanism 8 is in either the proper angular position or in an improper angular position which is diametrically opposite to the proper position, since the workpiece W is, in this embodiment, provided with two notches W5, W5 which are at diametrically opposite positions and are engaged with the guide rails 35, 35 to select the proper or improper angular position. By a signal issued by the limit switch 52, pressurized fluid is supplied to the hydraulic actuator 40, whereby the piston workpiece W is turned through 180° through the engaging pieces 38, 38. When an improperly positioned piston workpiece W is turned through the 180°, the engaging portion 46 of the link 45 is edged into the front mark notch W2 so that the limit switch 50 is actuated by the dog 49, whereby the fact that the piston workpiece W is located in a proper angular position is confirmed. Thereafter, pressurized fluid is again supplied into the upper chamber 41a of the actuator 41 to lower the piston 42 and the supporting block 44 fixed thereon. It is to be appreciated that when the piston workpiece W is moved into the indexing mechanism 8 in the proper angular position, the piston workpiece W need not be and is not turned to be indexed.

The operation of the second indexing mechanism 8 shown in FIG. 5 is described hereinunder. When all of the shutters are closed as in the first embodiment of the indexing mechanism, a fresh workpiece W is supported by the lower tips 67, 67 of the middle shutters 57, 57 in what ever angular position the workpiece occupies, since the workpiece W, in this particular case, is not provided with any marking notches at the skirt portion thereof and thus, it is next to impossible to slide the workpiece W in a particularly limited angular position. Thus, when the piston workpiece W slides into the indexing mechanism, the piston 130 is located at the upper position thereof by pressurized fluid applied to a lower chamber 134 of the actuator 133, and the pushing plate 139 likewise is located at its upper position. The piston rod 121a having the engaging pin 127 and the pin 128 therein is located at its lower position by means of the compression spring 125. Accordingly, the workpiece W may slide down into the indexing mechanism 8. When the pressurized fluid is applied to an upper chamber 136 of the actuator 133 and a lower chamber 122 of the actuator 121, the piston workpiece is sandwiched between the pushing plate 139 and the pins 127, 128 to be held therebetween. Collapse of the workpiece W may be avoided by means of the compression spring 131. Thereafter, pressurized fluid is supplied to the actuator 124 to turn the piston rod 121a through almost 370° so that the engaging pin 127 may engage the front mark W2 of the workpiece W. Until the pin 127 is engaged with the front mark W2, the pins 127 and 128 merely slide on the head W1 of the workpiece W. When the engagement between the front mark W2 and the engaging pin 127 is obtained, the workpiece W and the piston rod 121a are rotated simultaneously till the rotation of the piston rod 121a is completed so that the piston workpiece W may be brought into a particular required angular position. When the indexing operation is completed, piston rod 121a is lowered and the pushing plate 139 is raised so that the workpiece W is ready to slide down into the holding mechanism 17a. Thereafter the pressurized fluid is supplied to the actuator 124 to return the piston rod 121a to its original position. The workpiece W indexed into the proper angular position is then moved into the holding mechanism 17a without any deviation from the established angular position by means of guide rails 140 which engage the workpiece at the protruding portion W3 thereof. Thus, every piston workpiece W, in both indexing mechanism cases, is brought into the condition of the above-mentioned start time of the grinding operation.

As the above-metnioned operation is repeated, the piston workpieces are loaded one-by-one onto the machine in the correct required angular position.

Obviously, many modifications and variations of the present invention are possible in light of the above teachings. It is to be understood, therefore, that within

What is claimed as new and desired to be secured by LETTERS PATENT of the United States is:

1. A device for loading a non-circular workpiece onto a machine tool comprising:
    chute means for moving at least one workpiece disposed thereon in a predetermined axial orientation;
    indexing means on said chute means for indexing said at least one workpiece into a particular angular position;
    holding means mounted on one end of said chute means for holding said at least one workpiece indexed by said indexing means;
    shifting means for moving said at least one workpiece on said holding means to a clamping fixture of the machine tool; and
    turning means on said chute means for turning said holding means so as to obtain an alignment between an axis of said at least one workpiece on said holding means and an axis of said shifting means.

2. A device for loading a non-circular workpiece onto a machine tool comprising:
    chute means mounted on a machine tool perpendicular to an axis of a workpiece spindle for moving a workpiece;
    indexing means on said chute means for indexing a workpiece into a particular angular position;
    holding means mounted on one end of said chute means for holding a workpiece indexed by said indexing means in said particular angular position;
    shifting means mounted on said machine tool opposite said workpiece spindle for moving a workpiece on said holding means to a clamping fixture of the machine tool; and
    turning means on said chute means for turning said holding means to align an axis of said workpiece on said holding means with an axis of said shifting means.

3. A device for loading a non-circular workpiece onto a machine tool as set forth in claim 2, further comprising shutter means on said chute means for controlling the flow of a plurality of workpieces on said chute means.

4. A device for loading a non-circular workpiece onto a machine tool as set forth in claim 3, wherein said shutter means comprises:
    a first pair of shutters and a second pair of shutters for respectively moving said workpieces on said chute means one-by-one into said holding means and to an intermediate position between said indexing means and said holding means; and
    a third shutter for moving said workpieces one-by-one into said indexing means.

5. A device for loading a non-circular workpiece onto a machine tool as set forth in claim 4, wherein said shutter means further comprises:
    connecting means for connecting said first, second and third shutters; and
    power means connected to one of said shutters for simultaneously operating said shutters.

6. A device for loading a non-circular workpiece onto a machine tool as set forth in claim 5, wherein said holding means comprises:
    a pair of interengaged pinions;
    a pair of abutments secured to said pinions for holding a workpiece;
    elastic means for pulling said abutments toward each other;
    a control link engageable with one of said abutments; and
    a connecting rod connected between said control link and said power means,
    whereby when said first and second shutters are operated for discharging workpieces held therein and said third shutter is simultaneously moved to hold a workpiece by actuation of said power means, said abutments are moved against the force of said elastic means for receiving a workpiece from said first shutters by engagement between said one of said abutments and said control link through said connecting rod.

7. A device for loading a non-circular workpiece onto a machine tool as set forth in claim 4, wherein each of said shutters is provided with first and second tips, said second tip being arranged to engage a workpiece previously engaged with said first tip when said shutters are operated by said power means.

8. A device for loading a non-circular workpiece onto a machine tool as set forth in claim 2, wherein said chute means further comprises guide means for moving a workpiece in one of two particular angular positions.

9. A device for loading an non-circular workpiece onto a machine tool as set forth in claim 2, wherein said chute means further comprises guide means for moving a workpiece from said indexing means into said holding means in an indexed angular position.

10. A device for loading a non-circular workpiece onto a machine tool as set forth in claim 2, wherein said indexing means comprises: engaging means for engaging a workpiece at a particular portion thereof; and
    means for turning said engaging means more than 360°.

11. A device for loading a non-circular workpiece onto a machine tool as set forth in claim 2, wherein said indexing means comprises:
    means for detecting an angular position of said workpiece;
    said detecting means being mounted on said chute means and engageable with a workpiece at a particular portion thereof; and
    rotating means mounted on said chute means and engageable with a workpiece for turning a workpiece when said detecting means detects that the workpiece is located in an improper angular position.

12. A device for loading a non-circular workpiece onto a machine tool as set forth in claim 11, wherein said detecting means comprises:
    shifting means mounted on said chute means;
    an engaging link pivotably mounted on said shifting means being engaged with a workpiece when said shifting means is moved; and
    said engaging link having dogs for actuating a first and second limit switches which confirm that a workpiece is located in proper and improper positions, respectively.

13. A device for loading a non-circular workpiece onto a machine tool as set forth in claim 12, wherein said rotating means comprises:
an engaging piece for straddling a workpiece, and means for turning said engaging piece being mounted on said chute means.

14. A device for loading a non-circular workpiece onto a machine tool as set forth in claim 2, wherein said turning means comprises:
a shaft rotatably mounted on said chute means; and
drive means engaged with said shaft for rotating the same;
said holding means being mounted on said shaft whereby a workpiece on said holding means is rotated through a predetermined angle for causing an axis of a workpiece to coincide with an axis of a workpiece spindle.

15. A device for loading a non-circular workpiece onto a machine tool as set forth in claim 2, wherein said shifting means comprises:
supporting means for supporting a workpiece;
first power means for moving said supporting means toward and away from said holding means; and
second power means for moving said supporting means toward and away from the clamping fixture of the machine tool.

16. A device for loading a non-circular workpiece onto a machine tool as set forth in claim 15, wherein said first and second power means are hydraulic actuators, said second power means being mounted on said machine tool, said first power means being mounted on a piston rod of said second power means, and said supporting means being mounted on said second power means.

17. A device for loading a non-circular workpiece onto a machine tool as set forth in claim 16, wherein said supporting means comprises:
at least one locating pin movably mounted radially on said first power means for engaging a particular portion of a workpiece;
a control rod engaged with said locating pin; and
drive means mounted on said first power means for controlling said locating pin to engage and disengage the same with a workpiece.

18. A device for loading a non-circular workpiece onto a machine tool as set forth in claim 17, wherein said control rod is provided with at least one groove being oblique with respect to an axis thereof, said locating pin being engaged with said groove, whereby said locating pin is radially moved along said groove by axially moving said control rod.

* * * * *